United States Patent
Ogawa

(10) Patent No.: US 9,667,175 B2
(45) Date of Patent: May 30, 2017

(54) MOTOR CONTROL CIRCUIT AND METHOD

(71) Applicant: Semiconductor Components Industries, LLC, Phoenix, AZ (US)

(72) Inventor: Takashi Ogawa, Gifu-ken (JP)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 98 days.

(21) Appl. No.: 14/578,431

(22) Filed: Dec. 20, 2014

(65) Prior Publication Data

US 2015/0180389 A1 Jun. 25, 2015

Related U.S. Application Data

(60) Provisional application No. 61/918,693, filed on Dec. 20, 2013.

(51) Int. Cl.
| | |
|---|---|
| H02P 6/18 | (2016.01) |
| H02P 1/02 | (2006.01) |
| H02P 6/182 | (2016.01) |
| H02P 6/20 | (2016.01) |
| H02P 27/08 | (2006.01) |

(Continued)

(52) U.S. Cl.
CPC .............. *H02P 1/02* (2013.01); *H02P 6/085* (2013.01); *H02P 6/17* (2016.02); *H02P 6/182* (2013.01); *H02P 6/20* (2013.01); *H02P 27/085* (2013.01)

(58) Field of Classification Search
CPC ... H01L 2924/13091; H01L 2924/1305; H01L 2924/1306; H01L 2924/13063; H02P 6/182; H02P 7/29; H02P 27/08; H02P 3/14; H02P 21/22; H02P 1/48
See application file for complete search history.

(56) References Cited

U.S. PATENT DOCUMENTS

| | | | |
|---|---|---|---|
| 6,359,406 B1 | 3/2002 | Chiu et al. | |
| 6,483,270 B1 | 11/2002 | Miyazaki et al. | |

(Continued)

FOREIGN PATENT DOCUMENTS

| | | |
|---|---|---|
| JP | 2006-299810 A | 11/2006 |
| JP | 2008-43166 A | 2/2008 |

(Continued)

OTHER PUBLICATIONS

Application Note AN44140A by Panasonic, Sine-wave PWM drive system and rotor position detection method by 1-Hall-sensor, 1-Hall-Sensor Driver IC for 3-phase Brushless Motor; Doc No. TA4-EA-06180; Established Apr. 19, 2013; Revised Nov. 21, 2013.

(Continued)

*Primary Examiner* — Marlon Fletcher
(74) *Attorney, Agent, or Firm* — Rennie William Dover

(57) ABSTRACT

In accordance with an embodiment, a method for driving a motor includes decreasing a duty of an input signal to a motor and decreasing a duty of a duty control signal in response to decreasing the duty of the input signal The duty of the duty control signal is maintained at a first level in response to a reverse current signal and decreased from the first level in the absence of the reverse current signal. In accordance with another embodiment a driver circuit includes a state controller having an input coupled to a pulse width modulation detection circuit and an output connected to a reverse current detection circuit.

11 Claims, 6 Drawing Sheets

(51) Int. Cl.
*H02P 6/08* (2016.01)
*H02P 6/17* (2016.01)

(56) References Cited

U.S. PATENT DOCUMENTS

| | | | |
|---|---|---|---|
| 8,729,839 B2 | 5/2014 | Suzuki et al. | |
| 2008/0100243 A1* | 5/2008 | Kurosawa | G11B 19/2054 318/430 |
| 2013/0141025 A1* | 6/2013 | Takamori | H02H 3/003 318/400.21 |
| 2013/0193899 A1* | 8/2013 | Kurosawa | H02P 6/182 318/504 |
| 2013/0221880 A1 | 8/2013 | Sekihara | |
| 2015/0130378 A1* | 5/2015 | Sugiura | H02P 6/182 318/400.13 |
| 2015/0180389 A1* | 6/2015 | Ogawa | H02P 6/182 318/400.34 |
| 2016/0181954 A1* | 6/2016 | Satou | H02P 21/22 318/400.02 |

FOREIGN PATENT DOCUMENTS

| | | |
|---|---|---|
| JP | 4662729 B2 | 3/2011 |
| JP | 2012-105406 A | 5/2012 |
| JP | 2012-222950 A | 11/2012 |
| JP | 2013-31273 A | 2/2013 |
| JP | 2013-81320 A | 5/2013 |
| JP | 2013-183478 A | 9/2013 |

OTHER PUBLICATIONS

Application Note LV8804FV from ON Semiconductor, Bi-CMOS LSI PC and Server Fan Motor Driver Application Note, pp. 1-29, Dec. 2013, Semiconductor Components Industries, LLC, http://onsemi.com.
Datasheet No. BD63241FV from ROHM Semiconductor, DC Brushless Motor Drivers Three Phase 1 Hall Full-Sine Fan Motor Driver, pp. 1-15, 2013, TSZ22111-14-001, www.rohm.com.
Datasheet LV11961HA from ON Semiconductor, Bi-CMOS LSI for Brushless Motor Drive Sine Wave PWM Drive, Pre driver IC, pp. 1-14, Oct. 2014, Rev. 1, Publication Order No. LA11961HA/D, Semiconductor Components Industries, LLC, http://onsemi.com.
Datasheet LV8139JA from ON Semiconductor, Bi-CMOS LSI Single-phase Fan Motor Driver, pp. 1-18, May 2013, Ordering No. ENA2154, Semiconductor Components Industries, LLC, http://onsemi.com.

* cited by examiner

MOTOR CONTROL CIRCUIT AND METHOD

BACKGROUND

The present invention relates, in general, to motors and, more particularly, to three phase motors.

Multi-phase motors are used in a variety of applications including disc drives, digital video disc players, scanners, printers, plotters, actuators used in automotive and aviation industries, etc. Generally, multiple phase motors include a stationary portion or stator that produces a rotating magnetic field and a non-stationary portion or rotor in which torque is created by the rotating magnetic field. The torque causes the rotor to rotate which in turn causes a shaft connected to the rotor to rotate. The motors are driven by motor drive circuits.

Motor drive circuits are designed to meet desired motor performance parameters which may include noise level specifications, start-up specifications, maximum rotational speed specifications, etc. Noise specifications may be set to provide continuity of current flow during motor startup, or during motor rotation, or during motor stoppage. Start-up or motive power specifications may be set so that the motor reliably starts. Rotational speed specifications may be set to ensure there is sufficient torque drive to cover a large number of different motors. For example, the desired rotational speed of a server is higher than that of a personal computer. It is commonly believed that three-phase motors are better at achieving the desired specifications compared to single phase motors; however, three-phase motors cost more than single phase motors. In addition, three-phase motors provide current having sinusoidal characteristics from motor start-up to motor stoppage or cessation and they allow accurate determination of motor position and rotation speed. Three-phase motors typically include three Hall sensors, which is one of the reasons these motors are more expensive to manufacture. A Hall sensor may be referred to as a Hall element. U.S. Pat. No. 6,359,406 issued to Hsien-Lin Chiu et al. on Mar. 19, 2002, discloses three-phase motors and in particular discloses a three-phase motor having two Hall sensors or two Hall elements. A drawback with this technology is that it uses special bias circuitry that complicates its design and increases costs. A technique to lower the cost of three-phase motors is to manufacture the motor drive circuitry as a sensorless motor drive circuit, i.e., a motor without sensors. U.S. Pat. No. 6,570,351 issued to Shinichi Miyazaki et al. on May 27, 2003, discloses a three-phase motor without sensors. A drawback with sensor-less motor drive configurations is that they may fail to start if the inductive voltage of the coil is small. A drawback with the motor drive circuitry having a plurality of Hall sensors and with sensor-less, motor drive configurations is that they allow a reverse current to flow towards a power supply such as, for example, power supply $V_{SS}$, that may damage the drive circuit.

Accordingly, it would be advantageous to have a multi-phase motor drive circuit and a method for driving the motor configured to mitigate the effects of a reverse current flowing to a supply terminal. It is desirable for the multi-phase drive circuit and method to be cost and time efficient to implement.

BRIEF DESCRIPTION OF THE DRAWINGS

The present invention will be better understood from a reading of the following detailed description, taken in conjunction with the accompanying drawing figures, in which like reference characters designate like elements and in which.

Figure 1:
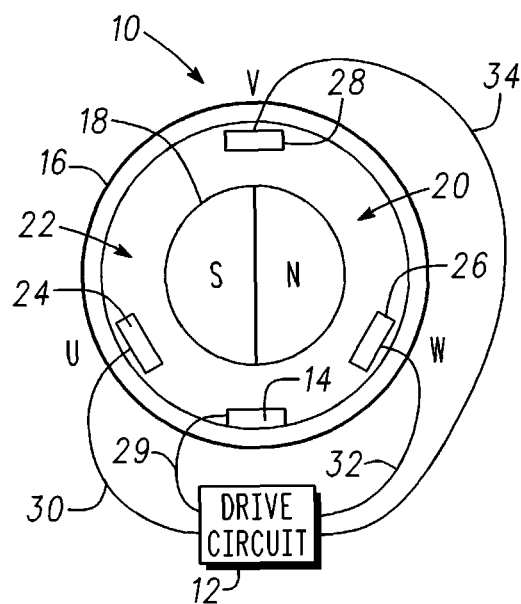
FIG. 1 is a diagrammatic representation of a motor that is driven by a drive circuit in accordance with an embodiment of the present invention.

For simplicity and clarity of illustration, elements in the figures are not necessarily to scale, and the same reference characters in different figures denote the same elements. Additionally, descriptions and details of well-known steps and elements are omitted for simplicity of the description. As used herein current carrying electrode means an element of a device that carries current through the device such as a source or a drain of an MOS transistor or an emitter or a collector of a bipolar transistor or a cathode or an anode of a diode, and a control electrode means an element of the device that controls current flow through the device such as a gate of an MOS transistor or a base of a bipolar transistor. Although the devices are explained herein as certain n-channel or p-channel devices, or certain n-type or p-type doped regions, a person of ordinary skill in the art will appreciate that complementary devices are also possible in accordance with embodiments of the present invention. It will be appreciated by those skilled in the art that the words during, while, and when as used herein are not exact terms that mean an action takes place instantly upon an initiating action but that there may be some small but reasonable delay, such as a propagation delay, between the reaction that is initiated by the initial action and the initial action. The use of the words approximately, about, or substantially means that a value of an element has a parameter that is expected to be very close to a stated value or position. However, as is well known in the art there are always minor variances that prevent the values or positions from being exactly as stated. It is well established in the art that variances of up to about ten percent (10%) (and up to twenty percent (20%) for semiconductor doping concentrations) are regarded as reasonable variances from the ideal goal of exactly as described.

It should be noted that a logic zero voltage level ($V_L$) is also referred to as a logic low voltage or logic low voltage level and that the voltage level of a logic zero voltage is a function of the power supply voltage and the type of logic family. For example, in a Complementary Metal Oxide Semiconductor (CMOS) logic family a logic zero voltage may be thirty percent of the power supply voltage level. In a five volt Transistor-Transistor Logic (TTL) system a logic zero voltage level may be about 0.8 volts, whereas for a five volt CMOS system, the logic zero voltage level may be about 1.5 volts. A logic one voltage level ($V_H$) is also referred to as a logic high voltage level, a logic high voltage, or a logic one voltage and, like the logic zero voltage level, the logic high voltage level also may be a function of the power supply and the type of logic family. For example, in a CMOS system a logic one voltage may be about seventy percent of the power supply voltage level. In a five volt TTL system a logic one voltage may be about 2.4 volts, whereas for a five volt CMOS system, the logic one voltage may be about 3.5 volts.

DETAILED DESCRIPTION

The present description includes, among other features, a drive circuit for driving a motor and a method for suppressing a regenerated current in a motor. In an aspect a duty controller (also referred to as a duty control circuit) reduces the duty of a drive signal, stops decreasing the duty of the drive signal, and holds the duty at a predetermined level in response to a control signal. Reducing the duty of the drive signal suppresses the occurrence of a reverse current. It should be noted that the reverse current may be referred to as a regeneration current. After the control signal has been cancelled, reduction of the output duty continues until the desired duty level is achieved. By way of example, the desired duty level may be 20%.

In accordance with an embodiment, a method for driving a motor includes decreasing a duty of an output signal of a control signal in response to decreasing the duty of an input signal to a motor. The duty of the duty control signal is maintained at a first level in response to a reverse current signal. By way of example, the drive signal is the signal appearing at output 108 of duty control controller 62.

In accordance with an aspect, the input signal is a pulse width modulation signal.

In accordance with an aspect, a modified reverse current signal is generated masking a portion of the reverse current signal while decreasing the duty of the duty control signal.

In accordance with another aspect, masking the portion of the reverse current signal includes generating a masking signal in response to a single period of a back electromotive force signal having a sine wave shape.

In accordance with another aspect a count value is generated in response to the period of time over which the modified reverse current signal is generated; the count value is compared with a reference value to generate a reverse current detection signal; and a reverse current determination signal is generated in response to the reverse current detection signal and a reverse current alert signal.

In accordance with another aspect, the duty of the duty control signal is decreased after maintaining the duty of the duty control signal at the first level in response to an absence of the reverse current signal.

In accordance with another aspect the duty of the duty control signal is linearly decreased from a second level to the first level; the duty of the duty control signal is maintained at the first level; and the duty of the duty control signal is linearly decreased from the first level to a third level.

In accordance with another aspect, the duty of the control signal is linearly decreased from the second level to the first level in response to the duty of the input signal changing from the second level to the third level.

In accordance with another embodiment, a method for suppressing a regenerated current in a motor is provided, wherein the method includes providing a current protection circuit having an input and an output and providing an input signal to the input of the current protection circuit, the input signal having a duty at a first level. An output signal is generated at the output of the current protection circuit in response to the input signal, wherein the output signal having a duty at a second level. The duty of the input signal is reduced from the first level and the duty of the output signal is reduced from the second level in response to reducing the duty of the input signal from the first level. The duty of the output signal is maintained at a third level in response to detecting a regenerative current.

In accordance with another aspect, reducing the duty of the output signal includes: reducing the duty of the input signal from 80 percent to 20 percent; linearly reducing the duty of the output signal from 80 percent; wherein maintaining the duty of the duty of the output signal includes maintaining the duty of the output signal at 30 percent for a first period of time; and reducing the duty of the output signal from 30 percent to 20 percent.

In accordance with another aspect, the duty of the output signal is reduced from the second level to a third level in response to the absence of detecting the regenerative current.

In accordance with another aspect, maintaining the duty of the output signal at a third level in response to detecting the regenerative current includes detecting the regenerative current for a predetermined time before maintaining the output signal at the third level.

FIG. 1 is a diagrammatic representation of a three-phase motor 10 that is driven by a drive circuit 12 in response to one or more signals from a Hall sensor 14 in accordance with an embodiment of the present invention. Drive circuit 12 may be referred to as a driver and Hall sensor 14 may be referred to as a Hall element. Three-phase motor 10 includes a stator 16 and a rotor 18 having a portion 20 magnetized with a first pole and a portion 22 magnetized with a second pole. By way of example, portion 20 is a north pole and portion 22 is a south pole. A U-phase winding 24 is coupled to or mounted on a portion of stator 16, a W-phase winding 26 is coupled to or mounted on another portion of stator 16, and a V-phase winding 28 is coupled to or mounted on yet another portion of stator 16. Drive circuit 12 is coupled to Hall sensor 14 via an electrical interconnect 29, to U-phase winding 24 via an electrical interconnect 30, to W-phase winding 26 via an electrical interconnect 32, and to V-phase winding 28 through an electrical interconnect 32. Electrical interconnects 30, 32, and 34 may be wires, electrically conductive traces, or the like.

Figure 2:
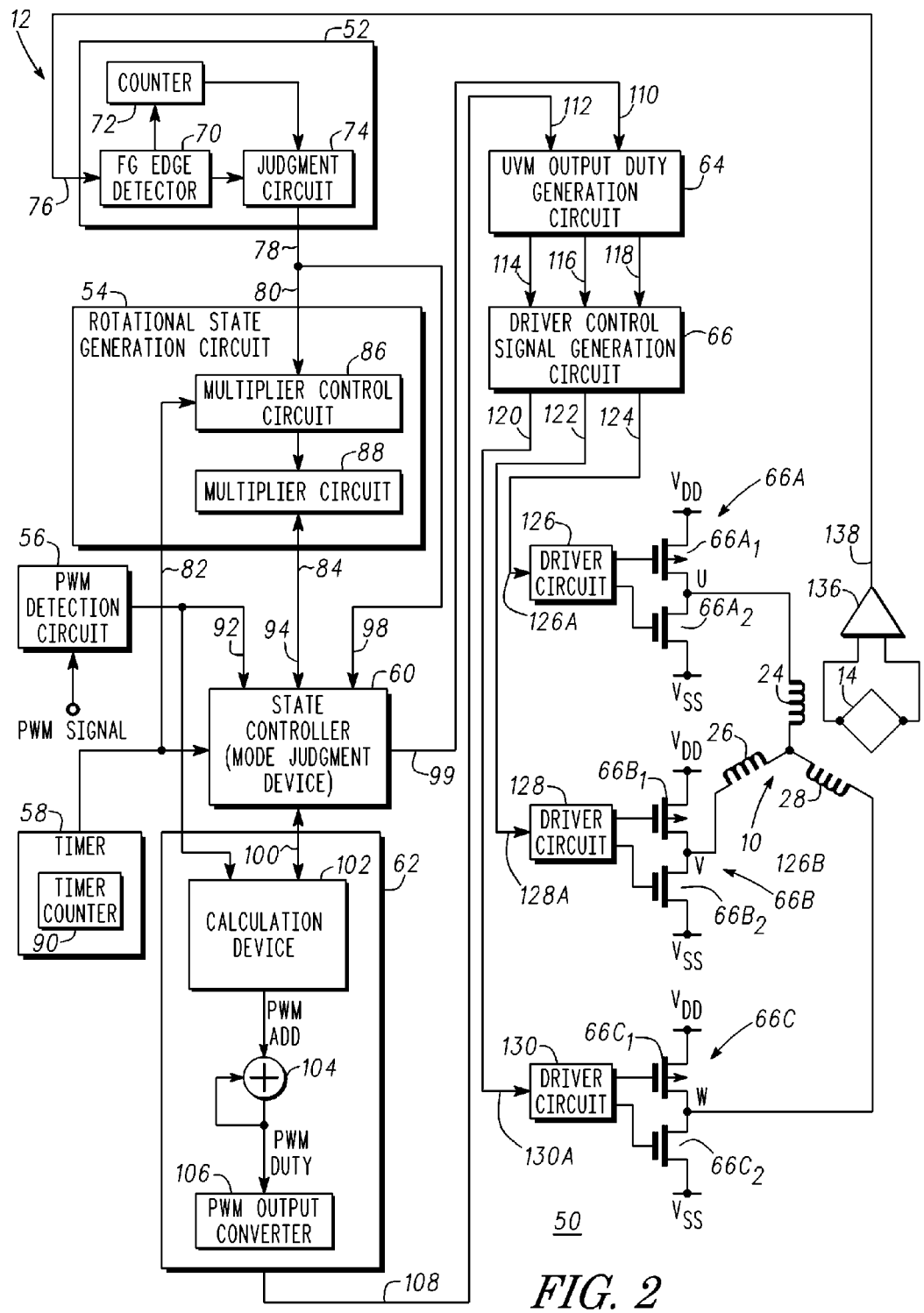
FIG. 2 is a block diagram further illustrating the drive circuit of FIG. 1.

FIG. 2 is a block diagram 50 further illustrating drive circuit 12. It should be noted that block diagram 50 includes diagrammatic representations of drive circuit 12, three-phase motor 10, and Hall sensor 14. Drive circuit 12 includes an FG signal masking circuit 52, a rotational state generation circuit 54, a pulse width modulation ("PWM") detection circuit 56, a timer 58, a status controller 60, a duty control controller 62, an output duty generation circuit 64, a drive control signal generation circuit 66, and an output drive stage 68. More particularly, FG signal masking circuit 52 may be comprised of an FG signal edge detector 70, a counter 72, and an FG signal judgment circuit 74. FG signal edge detector 70 has an input that serves as an input 76 of drive circuit 12, an output connected to an input of counter 72 and an output connected to an input of FG signal judgment circuit 74. An output 78 of FG signal judgment circuit 74 serves as an output of FG signal masking circuit 52. FG signal masking circuit 52 may be referred to as a chattering mitigation circuit or a chattering mitigation feature.

Rotational state generation circuit 54 has inputs 80 and 82, an input/output 84, and may be referred to as an FG generation circuit. Output 78 of FG signal masking circuit 52 is connected to input 80 of FG generation circuit 54.

Input/output 84 may be referred to as an input/output node, an I/O node, an input/output terminal, an I/O terminal, or the like. Rotational state generation circuit 54 may be comprised of a control circuit 86 coupled to a multiplier circuit 88. It should be noted that input 80 and input 84 are connected to multiplier control circuit 86 and input/output 84 is connected to multiplier circuit 88. PWM detection circuit 56 has an output connected to an input of state controller 60 and to an input of duty control controller 62 and is configured to determine the speed of rotor 18. It should be noted that if the duty range is small the speed of the rotor is smaller than if the duty range is large. Timer 58 has an output connected to input 82 of rotational state generation circuit 54 and to an input 92 of state controller 60 and may include a timer counter 90. In addition, state controller 60 has an input/output 94 connected to an input/output 84 of rotational state generation circuit 54, an input 98 connected to output 78 of FG signal masking circuit 52, and an input/output 96 connected to an input/output 100 of duty control controller 62. By way of example, duty control controller 62 is comprised of a calculation device 102 configured to determine an amount of change to the duty cycle, a summer 104, and a PWM converter 106. Calculation device 102 has an input that serves as input/output 100 and an output connected to an input of summer 104. In addition, summer 104 has an output that is connected to an input of PWM output converter 106 and to another input of summer 104. An output 108 of PWM output converter 106 serves as an output of duty control controller 62. State controller 60 is configured for determining the status or condition of the FG signal and the PWM signal and duty control controller 62 is configured to control an output sine wave, which helps to make the motor quieter.

Output duty generation circuit 64 has an input 110 connected to an output 99 of output of state controller 60, an input 112 connected to output 108 of output duty generation circuit 62, and a plurality of outputs 114, 116, and 118 connected to corresponding inputs of drive control signal generation circuit 66, which signal generation circuit 66 has a plurality of outputs 120, 122, and 124 connected to corresponding inputs of output drive stage 68. In accordance with an embodiment, drive stage 68 includes driver devices 126, 128, and 130 having inputs that serve as inputs 126A, 128A, and 130A of output drive stage 68, a pair 66A of transistors having a terminal connected to U-phase winding 24, a pair 66B of transistors having a terminal connected to W-phase winding 26, and a pair 66C of transistors having a terminal connected to V-phase winding 28. Pair of transistors 66A is comprised of transistors $66A_1$ and $66A_2$, wherein each transistor has a control electrode, and a pair of current carrying electrodes. The control electrodes of transistors $66A_1$ and $66A_2$ are coupled for receiving control signals from driver device 126, one current carrying electrode of transistor $66A_1$ is coupled for receiving a source of potential $V_{DD}$ and the other current carrying electrode of transistor $66A_1$ is connected to a current carrying electrode of transistor $66A_2$. The other current carrying terminal of transistor $66A_2$ is coupled for receiving a source of potential $V_{SS}$ such as, for example, a ground potential. The commonly connected current carrying electrodes of transistors $66A_1$ and $66A_2$ are connected to U-phase winding 24.

Pair of transistors 66B is comprised of transistors $66B_1$ and $66B_2$, wherein each transistor has a control electrode, and a pair of current carrying electrodes. The control electrodes of transistors $66B_1$ and $66B_2$ are coupled for receiving control signals from driver device 128, one current carrying electrode of transistor $66B_1$ is coupled for receiving a source of potential $V_{DD}$ and the other current carrying electrode of transistor $66B_1$ is connected to a current carrying electrode of transistor $66B_2$. The other current carrying terminal of transistor $66B_2$ is coupled for receiving a source of operating potential $V_{SS}$ such as, for example, a ground potential. The commonly connected current carrying electrodes of transistors $66B_1$ and $66B_2$ are connected to U-phase winding 26.

Pair of transistors 66C is comprised of transistors $66C_1$ and $66C_2$, wherein each transistor has a control electrode, and a pair of current carrying electrodes. The control electrodes of transistors $66C_1$ and $66C_2$ are coupled for receiving control signals from driver device 130, one current carrying electrode of transistor $66C_1$ is coupled for receiving a source of potential $V_{DD}$ and the other current carrying electrode of transistor $66C_1$ is connected to a current carrying electrode of transistor $66C_2$. The other current carrying terminal of transistor $66C_2$ is coupled for receiving a source of operating potential $V_{SS}$ such as, for example, a ground potential. The commonly connected current carrying electrodes of transistors $66C_1$ and $66C_2$ are connected to U-phase winding 28.

A comparator 136 has inputs connected to corresponding inputs of a Hall sensor 14 and an output 138 connected to input 76 of rotational state generation circuit 54.

It should be noted that in accordance with an alternative embodiment, FG signal masking circuit 52 is absent from drive circuit 12 and that output 138 of comparator 136 is commonly connected to input 76 of rotational state generation circuit 54 and to input 98 of state controller 60.

In accordance with an embodiment of the present invention, an integrated circuit is configured to include a reverse current detection circuit 400 configured to detect a reverse current can flow into a power supply terminal when the rotor of a motor is in steady state rotation during low speed operation, or during the transitions from a low speed rotation rate to a high speed rotation rate, or via a parasitic diode of the P-channel device at the time the N-channel device is turned off to regenerate the N-channel. In the example in which a reverse current occurs in steady state rotation during low speed operation, the sine wave of the PWM signal is out of phase.

In accordance with embodiments in which the integrated circuit is part of control circuit 12, duty control controller 62 generates an output PWM signal at its output terminal 108 for driving a motor such as, for example, motor 10. The integrated circuit includes a resistor configured to detect a current flowing through a supply terminal of the integrated circuit and a comparator that compares a reference voltage with a voltage developed across the resistor. The reverse current may be detected using the comparator to compare the reference voltage with a voltage developed across the resistor in response to a current flowing through the resistor. It should be noted that a result of the comparison may bring the output PWM to a stopped or ceased status.

Figure 3:
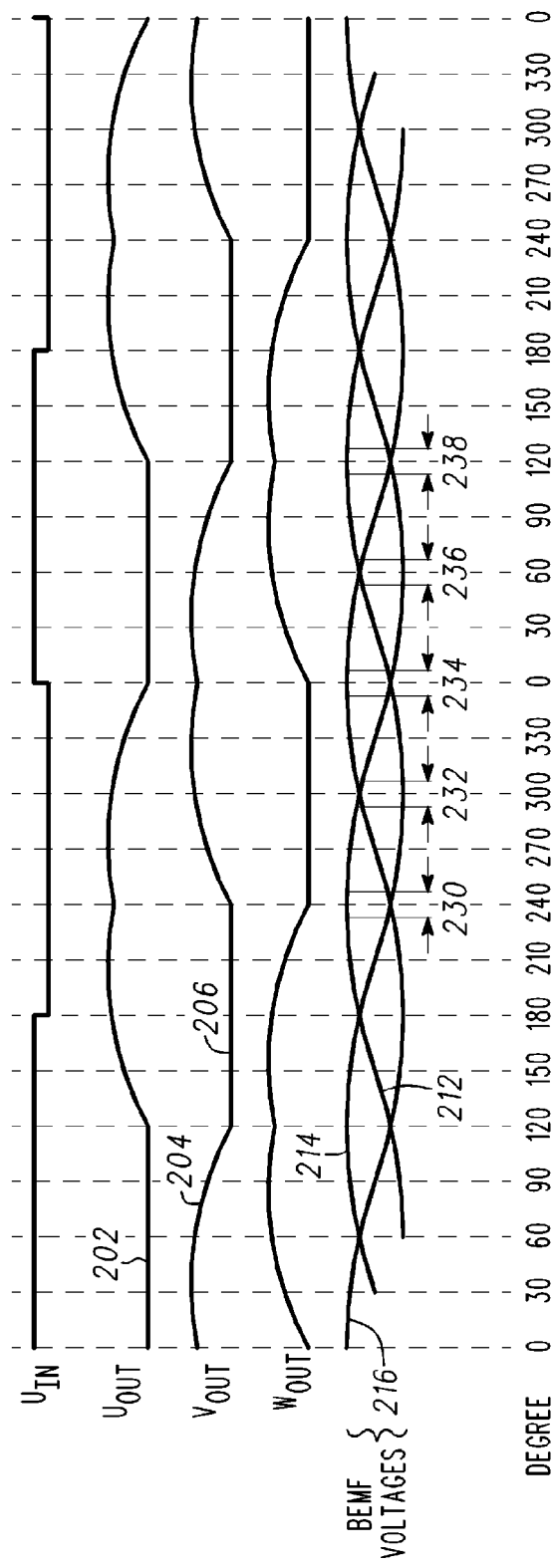
FIG. 3 is a timing diagram illustrating back electromotive force voltages and output voltages in accordance with an embodiment of the present invention.

FIG. 3 is a timing diagram 200 illustrating the back electromotive force (BEMF) voltages in response to U-phase, V-phase, and W-phase output signals in accordance with an embodiment of the present invention. What is shown in FIG. 3 is the U-phase output signal $U_{OUT}$ across coil 24, the V-phase output signal $V_{OUT}$ across coil 28, and the W-phase output signal $W_{OUT}$ across coil 26, where output signal $U_{OUT}$ is identified as trace 202, output signal $V_{OUT}$ is identified as trace 204, and output signal $W_{OUT}$ is identified as trace 206. In addition, timing diagram 200 illustrates BEMF voltages 212, 214, and 216 associated with output signals 202, 204, and 206, respectively. It should be noted that BEMF voltages 212, 214, and 216 have sinusoidal shapes. For a period of the sinusoidal voltages 212, 214, and 216 ranging from 180 degrees to 180 degrees, BEMF signals 214 and 216 are at the same voltage levels at 240 degrees; BEMF signals 212 and 216 are at the same voltage level at 300 degrees; BEMF signals 212 and 214 are at the same voltage level at 0 degrees; BEMF signals 212 and 216 are at the same voltage level at 60 degrees; and BEMF signals 212 and 216 are at the same voltage level at 120 degrees. Reverse currents that appear in the regions near 240 degrees identified within arrowheads 230, near 300 degrees identified within arrowheads 232, near 0 degrees identified within arrowheads 234, near 60 degrees identified within arrowheads 236, and near 120 degrees identified within arrowheads 238 are detrimental to motor performance.

Figure 4:
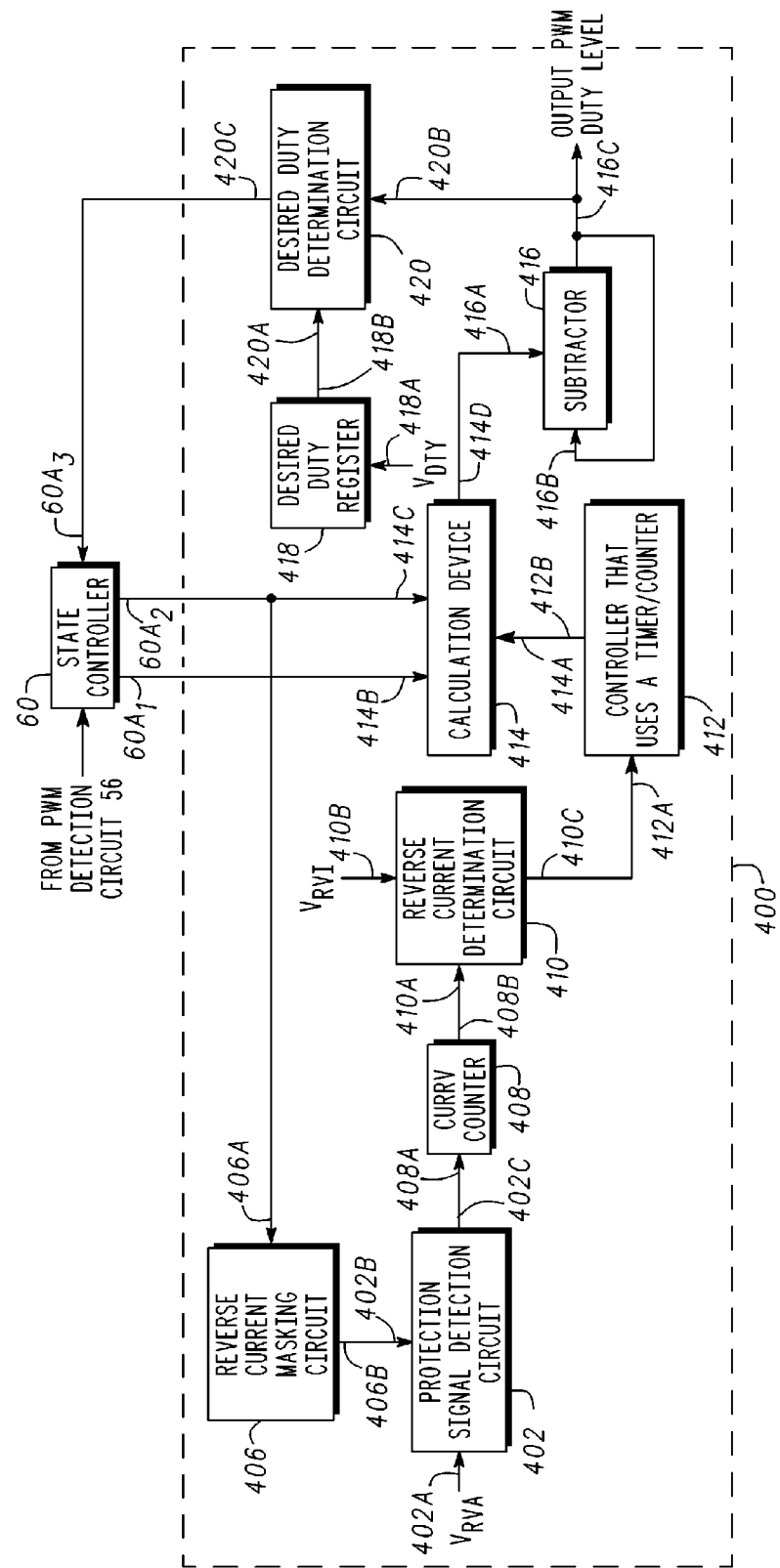
FIG. 4 is a circuit diagram of a reverse current detection circuit in accordance with another embodiment of the present invention.

FIG. 4 is circuit schematic of an embodiment of reverse current detection circuit 400, which includes a protection signal detection circuit 402, a reverse current masking circuit 406, a reverse current counter 408, a reverse current determination circuit 410, a controller 412 that uses a timer or counter, a calculation device 414, a subtractor 416, a desired duty register 418, a duty determination circuit 420, and state controller 60. More particularly, protection signal detection circuit 402 has an input 402A coupled for receiving a reverse current comparator signal $V_{RVC}$, an input 402B connected to an output 406B of reverse current masking circuit 406, and an output 402C. It should be noted that the acronym CURRV in FIG. 4 stands for reverse current. Reverse current counter 408 has an input 408A connected to output 402C of reverse current detection circuit 402 and an output 408B connected to an input 410A of determination counter 410, which counter 410 has another input terminal 410B coupled for receiving a reverse current alert signal $V_{RVA}$. Controller 412 has an input 412A connected to an output 410C of reverse current determination circuit 410 and an output 412B connected to an input 414A of calculation device 414. In addition, calculation device 414 has an input 414B connected to an output $60A_1$ of state controller 60 and an input 414C connected to an output $60A_2$ of state controller 60. Calculation device 414 has an output 414D connected to an input 416A of subtractor 416. An input 416B of subtractor 416 is connected to an output 416C of subtractor 416.

A duty register 418 has an input 418A coupled for receiving a desired duty signal $V_{DTY}$ and an output 418B connected to an input 420A of duty determination circuit 420. Duty determination circuit 420 has an input connected to output 416C of subtractor 416 and an output 420C connected to an input $60A_3$ of state controller 60. Output 416C is coupled to or, alternatively, serves as, an output of current detection circuit 400, i.e., serves as output 108 shown in FIG. 2.

Figure 5:
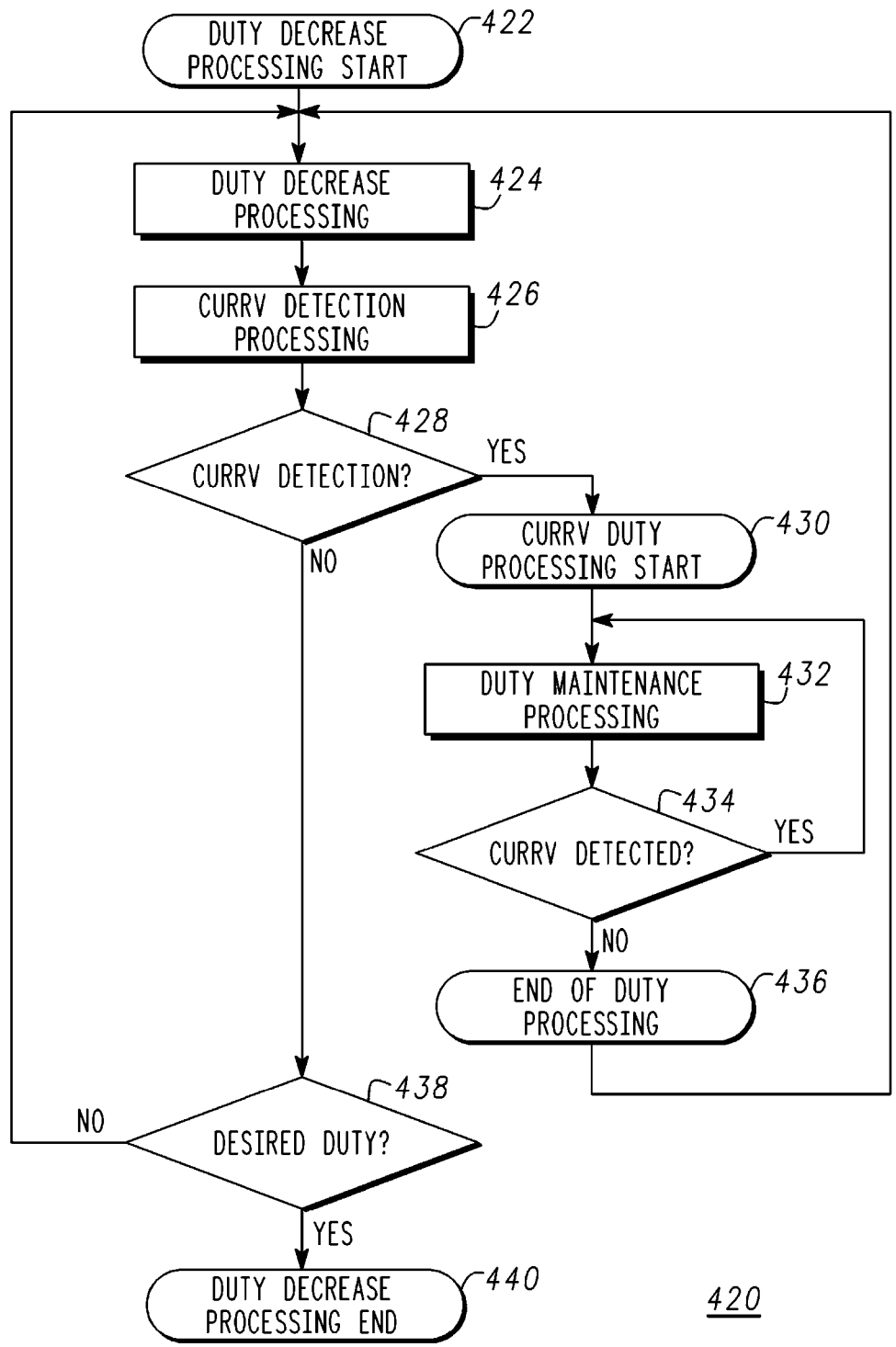
FIG. 5 is a flow diagram depicting reverse current detection in accordance with an embodiment of the present invention.

FIG. 5 is a flow diagram 420 illustrating the monitoring and detection of a reverse current. The start of reverse current detection is indicated by box 422. At an early stage of the reverse current detection process, the duty of an input PWM signal is decreased (indicated by box 424). Decreasing or switching the input PWM duty from a high duty to a low duty reduces the output duty. By way of example, a high duty may be a duty of greater than or equal to 50 percent and a low duty may be a duty of less than 50 percent. In response to decreasing the duty of the input PWM signal, reverse current detection circuit 400 begins the reverse current detection process (indicated by box 426). The reverse current detection process of box 426 is further illustrated and described with reference to FIG. 6. Still referring to FIG. 5, if reverse current detection circuit 400 does not detect a reverse current, indicated by the NO branch of decision diamond 428, reverse current detection circuit 400 determines if the output duty has reached a predetermined level (indicated by decision diamond 438. If the predetermined duty level or desired duty level has been reached (indicated by the YES branch of decision diamond 438), reverse current detection circuit 400 stops decreasing the duty of the input signal (indicated by box 440). If the predetermined duty has not been reached (indicated by the NO branch of decision diamond 438, reverse current detection circuit 400 continues decreasing the duty of the input PWM waveform.

If reverse current detection circuit 400 detects a reverse current, indicated by the YES branch of decision diamond 428, reverse current detection circuit 400 begins a reverse current duty processing step (indicated by box 430). As the duty of the input PWM signal is decreased, reverse current detection circuit 400 determines whether a reverse current is detected. In response to detecting a reverse current, circuit 400 maintains the output duty at a substantially constant value as indicated by box 432. In response to continuing to detect a reverse current, current detection circuit 400 maintains the output duty at the substantially constant value as indicated by the YES branch of decision diamond 434. In the absence of a reverse current, i.e., the reverse current not being detected, circuit 400 stops maintaining the output duty and continues decreasing the output duty as indicated by the NO branch of decision diamond 434 and the continuation of the process at box 434.

Figure 6:
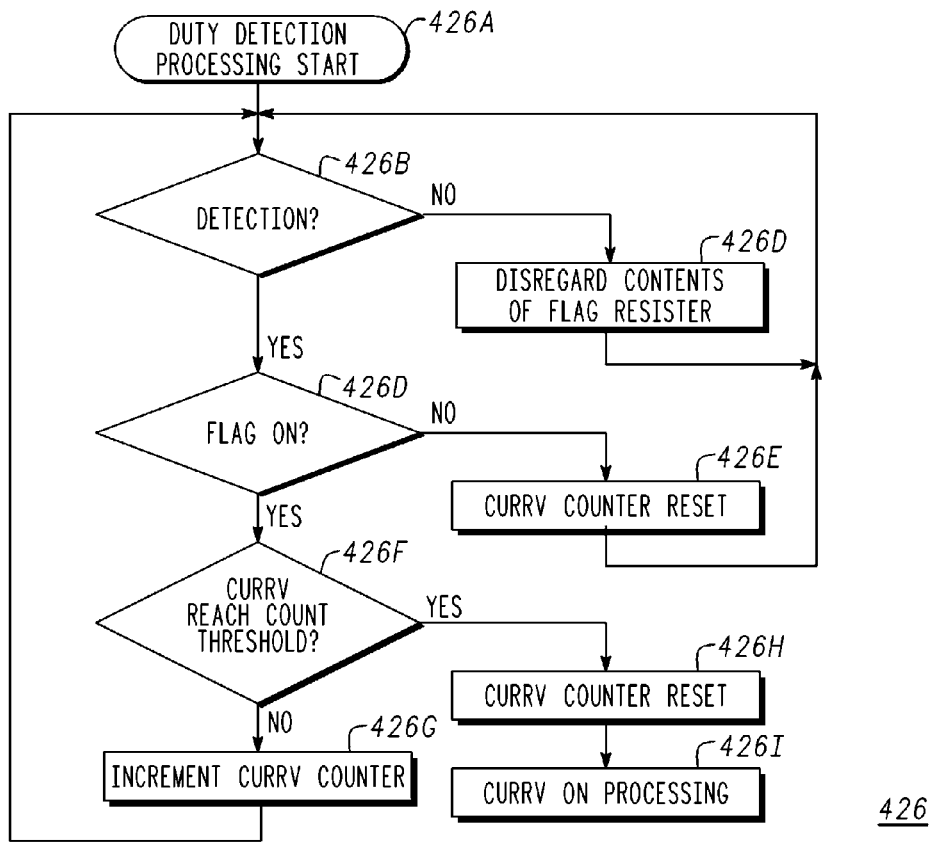
FIG. 6 is a flow diagram of a portion of a process flow for detecting a reverse current in accordance with an embodiment of the present invention.

As mentioned above, the reverse current detection process of box 426 is further illustrated and described with reference to FIG. 6. Referring now to FIG. 6, reverse current detection circuit 400 begins a process for detecting whether a reverse current is present as indicated by box 426A. As discussed above, the reverse current may be detected using a comparator to compare a reference voltage with a voltage developed across a resistor in response to a current flowing through the resistor. It should be noted that a result of the comparison may bring the output PWM to a stopped or ceased status. In accordance with an embodiment, the reverse current is detected in response to the duty decreasing rather than in response to motor 10 running at a nominal speed or during nominal or normal operation. If a reverse current is not present or not detected, then circuit 400 continues operating in a detection mode to detect whether a reverse current is present as indicated by the NO branch of decision diamond 426B. In this case a flag or register within protection signal detection circuit 402 is configured so that circuit 400 continues to monitor whether a reverse current is present at decision diamond 426B. If circuit 400 determines that a reverse current is present (indicated by the YES branch of decision diamond 426B), then circuit 400 determines whether the reverse current is a continuous signal at decision diamond 426D by monitoring a flag or register in protection signal detection circuit 402. Protection circuit 402 receives a masking signal from masking circuit 406 that masks out portions of the reverse current in response to a single period of a back electromotive force signal and a single FG signal. In particular, masking circuit 406 masks out the portions of the back electromagnetic force signal that are outside regions 230, 232, 234, 236, and 238 shown in FIG. 3 to form a modified reverse current signal. It should be appreciated that the portions of the reverse currents that outside regions 230, 232, 234, 236, and 238 do not have a large impact on circuit performance. If the flag is not set, the reverse current is not continuous, reverse current detection counter 408 (shown in FIG. 4) is reset, and circuit 400 continues detecting whether a reverse current is present at decision diamond 426B. If the flag is set then circuit 400 determines whether a reverse current detection threshold has been reached (indicated by decision diamond 426F). Thus, circuit 400 determines whether a reverse current has occurred in accordance with a count value indicating the presence of a reverse current. If the count value has not been reached then counter 408 is increased or incremented by a desired amount (indicated by the NO branch of decision diamond 426F). By way of example, counter 408 is incremented by one and circuit 400 continues detecting whether a reverse current is present at decision diamond 426B. If the count value has been reached indicating that a reverse current has occurred, counter 408 is reset (indicated by the NO branch of decision diamond 426F and box 426H) and processing continues at decision diamond 428 shown in FIG. 5.

Figure 7:
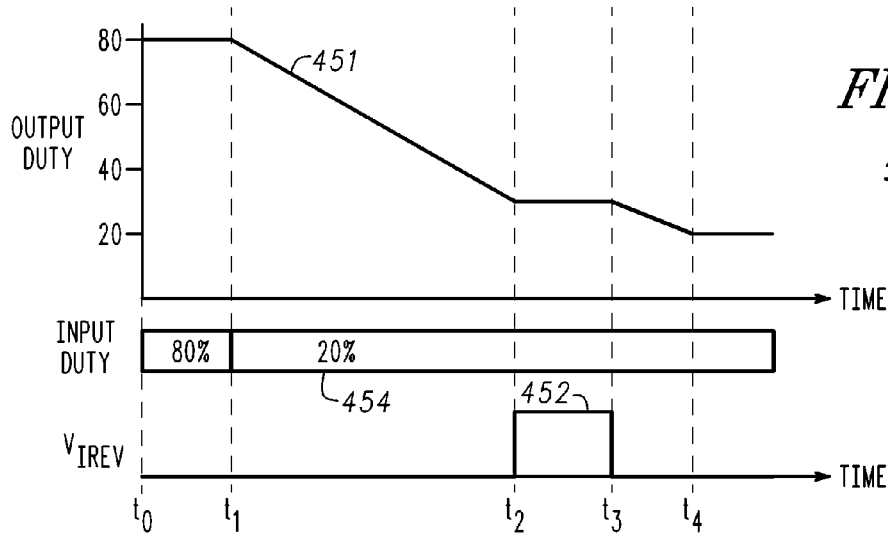
FIG. 7 is a plot illustrating the duty of the output signal and the reverse versus time in accordance with an embodiment of the present invention.

FIG. 7 is a plot 450 of input duty versus time, output duty versus time, and a reverse current indicator signal, $V_{IREV}$, versus time in accordance with an embodiment of the present invention. It should be noted that in plot 450, the input duty trace is identified by reference character 452, the output duty trace is identified by reference character 454, and the reverse current indicator signal trace is identified by reference character 456. What is shown in FIG. 7 is that between time $t_0$ and $t_1$, the input duty is at 80 percent (%), the output duty is at 80%, and the trace showing the reverse current indicator signal ($V_{IREV}$) is at a logic low or logic zero ($V_L$). At time $t_1$, the input duty is decreased from 80% to 20% and in response to this change in the input duty, the output duty begins to decrease. At time $t_2$, the reverse current indicator signal indicates the presence of a reverse current indicated by trace 456 transitioning from a logic low voltage level ($V_L$) to a logic high voltage level ($V_H$). In response to the presence of a reverse current, the output duty is maintained at 30% and the input duty remains at 20%. At time $t_3$, the reverse current indicator signal indicates the absence of a reverse current indicated by trace 456 transitioning from a logic high voltage level ($V_H$) to a logic low voltage level ($V_L$). In response to the absence of a reverse current, the output duty is linearly reduced and at time $t_4$ the output duty is maintained at 20%. It should be noted that the duty values of 80%, 30%, and 20% are not limitations of the present invention and the duty values may be different from these duty values.

Although specific embodiments have been disclosed herein, it is not intended that the invention be limited to the disclosed embodiments. Those skilled in the art will recognize that modifications and variations can be made without departing from the spirit of the invention. It is intended that the invention encompass all such modifications and variations as fall within the scope of the appended claims.

What is claimed is:

1. A method for driving a motor, comprising:
   decreasing a duty of an input signal to be received by a motor;
   decreasing a duty of a duty control signal in response to decreasing the duty of the input signal;
   maintaining the duty of the duty control signal at a first level in response to a reverse current signal;
   generating a modified reverse current signal by masking a portion of the reverse current signal while decreasing the duty of the duty control signal;
   generating a count value in response to the period of time over which the modified reverse current signal is generated;
   comparing the count value with a reference value to generate a reverse current detection signal; and
   generating a reverse current determination signal in response to the reverse current detection signal and a reverse current alert signal.

2. The method of claim 1, wherein the input signal is a pulse width modulation signal.

3. The method of claim 1, wherein masking the portion of the reverse current signal includes generating a masking signal in response to a single period of a back electromotive force signal having a sine wave shape.

4. The method of claim 1, further including, in response to an absence of the reverse current signal, decreasing the duty of the duty control signal after maintaining the duty of the duty control signal at the first level.

5. A method for driving a motor, comprising:
   decreasing a duty of an input signal to be received by a motor;
   decreasing a duty of a duty control signal in response to decreasing the duty of the input signal;
   maintaining the duty of the duty control signal at a first level in response to a reverse current signal;
   in response to an absence of the reverse current signal, decreasing the duty of the duty control signal after maintaining the duty of the duty control signal at the first level, wherein decreasing the duty of the duty control signal includes:
   linearly decreasing the duty of the duty control signal from a second level to the first level;
   maintaining the duty of the duty control signal at the first level; and
   linearly decreasing the duty of the duty control signal from the first level to a third level.

6. The method of claim 5, further including linearly decreasing the duty of the control signal from the second level to the first level in response to the duty of the input signal changing from the second level to the third level.

7. A method for driving a motor, comprising:
   providing a current protection circuit having an input and an output;
   providing an input signal to the input of the current protection circuit, a duty of the input signal at a second level;
   decreasing the duty of an input signal to a motor;
   decreasing a duty of a duty control signal in response to decreasing the duty of the input signal;
   maintaining the duty of the duty control signal at a first level in response to a reverse current signal;
   generating the control signal at the output of the current protection circuit in response to the input signal, the duty of the control signal at a third level; wherein
   decreasing the duty of the input signal includes decreasing the duty of the input signal from the second level and decreasing the duty of the control signal includes decreasing the duty of the control signal from the third level.

8. The method of claim 7, wherein the duty at the first level of the input signal equals the duty at the second level of the control signal.

9. The method of claim 7, wherein reducing the duty of the control signal includes:
   reducing the duty of the input signal from 80 percent to 20 percent;
   linearly reducing the duty of the control signal from 80 percent; wherein
   maintaining the duty of the duty of the control signal includes maintaining the duty of the control signal at 30 percent for a first period of time; and
   reducing the duty of the control signal from 30 percent to 20 percent.

10. The method of claim 7, wherein maintaining the duty of the control signal at the first level in response to detecting the reverse current includes detecting the reverse current for a predetermined time before maintaining the control signal at the first level.

11. The method of claim 7, wherein the input signal is a pulse width modulation signal.

\* \* \* \* \*